US006789470B2

(12) United States Patent
Luebcke

(10) Patent No.: US 6,789,470 B2
(45) Date of Patent: Sep. 14, 2004

(54) COOLING DEVICE FOR COOLING AN ENGRAVING SYSTEM

(75) Inventor: Bernd Luebcke, Molfsee (DE)

(73) Assignee: Hell Gravure Systems GmbH, Kiel (DE)

( * ) Notice: Subject to any disclaimer, the term of this patent is extended or adjusted under 35 U.S.C. 154(b) by 117 days.

(21) Appl. No.: 10/027,428

(22) Filed: Dec. 19, 2001

(65) Prior Publication Data

US 2002/0104448 A1 Aug. 8, 2002

(30) Foreign Application Priority Data

Jan. 12, 2001 (DE) ........................................ 101 01 134

(51) Int. Cl.$^{7}$ .......................... B41F 17/08; H04N 1/21; F25B 29/00

(52) U.S. Cl. ...................... 101/38.1; 101/487; 101/216; 101/350.1; 358/296; 358/299; 358/329; 358/477; 358/478; 165/58; 165/61; 165/65; 165/66; 165/110; 261/3; 261/19

(58) Field of Search ............................ 101/350.1, 487, 101/38.1, 216; 358/299, 296, 329, 246; 165/58, 61, 65, 66, 110; 261/3, 19

(56) References Cited

U.S. PATENT DOCUMENTS

| | | | | | |
|---|---|---|---|---|---|
| 5,731,881 | A | * | 3/1998 | Buechler | 358/299 |
| 5,749,295 | A | * | 5/1998 | Kurz | 101/350 |
| 5,947,020 | A | * | 9/1999 | Bornhorst, Jr. et al. | 101/32 |
| 6,202,556 | B1 | * | 3/2001 | Lagger | 101/216 |
| 6,293,199 | B1 | * | 9/2001 | Gaspatrrini et al. | 101/487 |
| 6,347,891 | B1 | * | 2/2002 | Muckerheide et al. | 395/104 |

FOREIGN PATENT DOCUMENTS

| | | | |
|---|---|---|---|
| DE | 197 54 379 | 6/1999 | |
| DE | 198 12 786 | 9/1999 | |
| EP | 0 710 550 | 5/1996 | |
| EP | 1090709 | * 11/2001 | B23K/26/00 |

* cited by examiner

*Primary Examiner*—Andrew H. Hirshfeld
*Assistant Examiner*—Marvin P. Crenshaw
(74) *Attorney, Agent, or Firm*—Schiff Hardin LLP

(57) ABSTRACT

In a cooling device and method for cooling an engraving system of an engraving device given engraving devices for engraving printing form surfaces, the cooling device comprises a plurality of cooling units wherein each cooling unit is allocated to respectively cool one engraving head.

16 Claims, 3 Drawing Sheets

COOLING DEVICE FOR COOLING AN ENGRAVING SYSTEM

BACKGROUND OF THE INVENTION

The invention relates to a cooling device for cooling an engraving system as well as to a method for cooling engraving systems. During operation, machine parts are often subjected to mechanical and/or thermal stresses. When required in the case of thermal stressing, cooling devices are employed that keep the temperature of the machine part to be cooled below a specific tolerance value. In the printing industry, engraving systems that engrave a printing form surface, usually a printing form cylinder, with an engraving tip are employed in letterpress and rotogravure printing. Due to the thermal losses of the electromagnetic excitation and the high speed, thermal stresses arise at the engraving system that lead to mechanical expansions and a modified damping of the engraving head. These undesirable variations at the engraving system in turn lead to undesirable changes in the result of the engraving. Engraving systems are therefore usually cooled either with an especially effective air cooling or with a centrally arranged cooling device that is respectively connected to the engraving system via an incoming hose and a return hose and that pumps cooling water from a central recooling unit. Disadvantages given the latter version are the complex hose connections, the long hose paths which occupy considerable operating space, and the high maintenance cost therefor.

SUMMARY OF THE INVENTION

It is an object of the invention to provide an effective cooling device for cooling engraving systems.

According to the method and system of the invention, for cooling an engraving head mounted on a support, first and second heat exchangers are provided on the support, the second heat exchanger being associated with the engraving head being cooled. A coolant flows between the first heat exchanger and the second heat exchanger.

Three exemplary embodiments of the invention are described below on the basis of FIGS. 1 through 3. There are, of course, other embodiments which can be envisioned by those skilled in the art.

DESCRIPTION OF THE PREFERRED EMBODIMENTS

Figure 1:
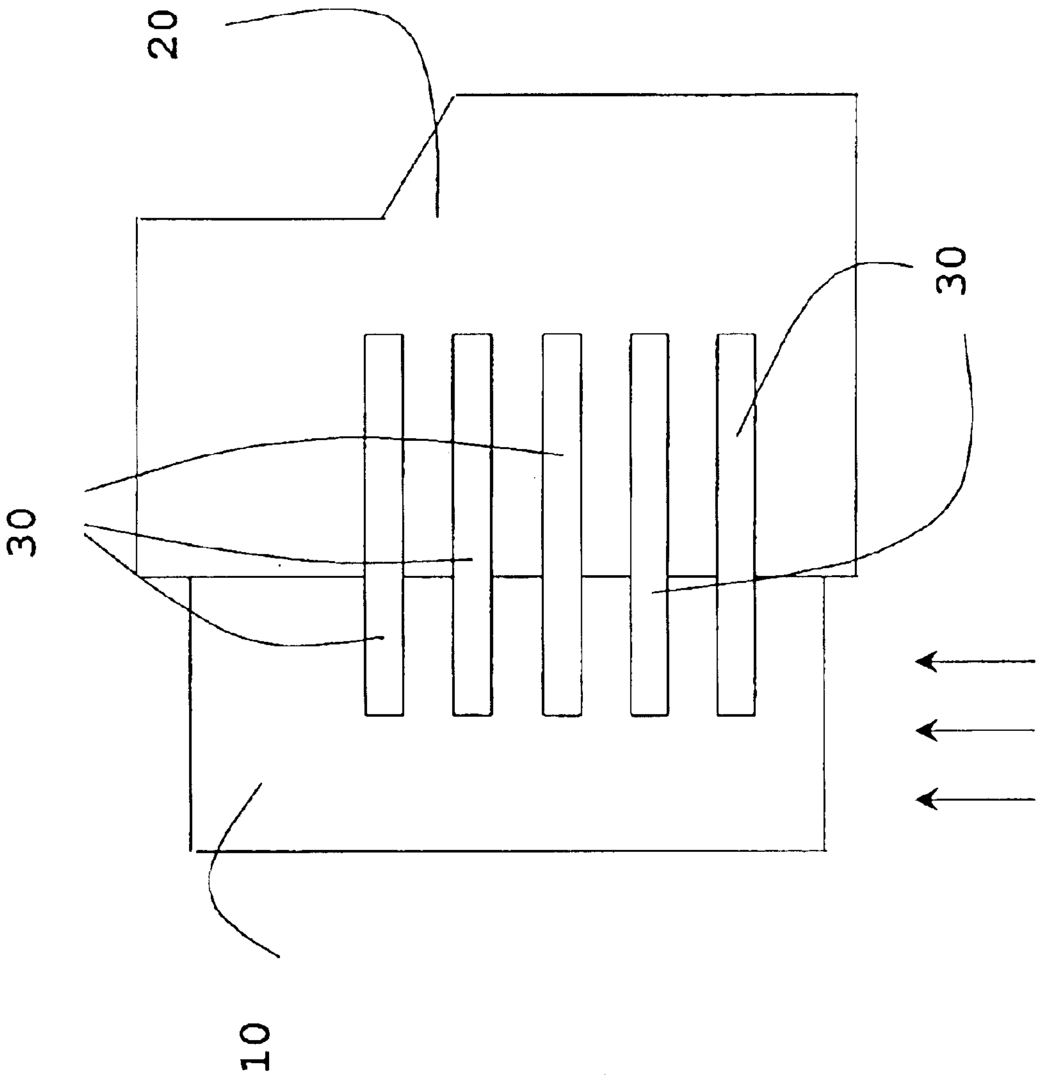
FIG. 1 is a schematic illustration of a cooling device from which heat pipes extend into a heat exchanger of an engraving system adjacent to the cooling device.

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

A cooling device is provided for cooling an engraving system of an engraving apparatus for engraving printing forms, such as printing cylinders for rotogravure, for example, where the engraving system comprises a plurality of engraving heads respectively carried by supports. The cooling device comprises a plurality of cooling units, respectively, one cooling unit thereof being allocated to one engraving head. Material costs and assembly and maintenance work for the hose connections are eliminated in this way. Further, pumps and electrical power required therefor for a previously employed, centrally arranged cooling device are saved, since the coolant of the cooling device is moved by thermodynamic forces in the cooling circulation in the immediate proximity of the engraving device.

Each cooling unit may contain a heat pipe with capillary structures arranged at its inside walls, the one end thereof projecting into the region of the engraving head. The heat pipes extend from the engraving system to the cooling device, and the engraving system and the cooling device are adjacent to one another. The capillary structures at the inside walls of the heat pipes increase the surface through which a medium flows in the interior of the heat pipes and therefore increase the absorption of heat from the engraving system by the coolant flowing through the heat pipes. By employing heat pipes, further, complicated connector devices for connecting the hoses to the engraving system and central cooling devices are eliminated since the heat pipes extend in the housing walls of the cooling device and of the engraving device with the engraving system, for example by means of simple recesses.

In another improvement of the cooling device, the heat pipes have a liquid medium flowing through them since suitable liquids comprise a high specific thermal conductivity for the purpose of transmitting thermal energy from the engraving system via the conductive housing of the heat pipes to the liquid medium, so that an even more effective cooling is achieved.

FIG. 1 shows a heat exchanger 10 as part of an embodiment of a cooling device. The delivery of a medium to a heat exchanger 10 of the cooling device is symbolically shown in the lower section of FIG. 1 as three arrows proceeding from bottom to top. In this embodiment, this medium can, for example, be a coolant liquid that the cooling device pumps into and out of the heat exchanger 10. A second heat exchanger 20 in the region of an engraving head (not shown) as part of an engraving system of an engraving device is located adjacent to the heat exchanger 10. Heat pipes 30 extend from the interior of the one to the interior of the other heat exchanger 10 or 20. The heat pipes 30 are closed off in vacuum-tight fashion from their surroundings.

In a modification of this embodiment according to FIG. 1, the two heat exchangers 10, 20 are implemented of one piece. The cooling device is embraced by the engraving system, and the plurality of heat exchangers 10, 20 is advantageously reduced to one heat exchanger. This modification is not described in greater detail below.

The coolant cooled in the cooling device is supplied to the heat exchanger 10, as indicated by the directional arrows, and cools the environment of the heat pipes 30 and thus the heat pipes 30 and the heat transport medium contained therein as well due to the thermal conduction. The heat transport medium flows from one side of the individual heat pipes 30 to the other side and changes the aggregate state from the gaseous in the left side in the heat exchanger 10 of FIG. 1 to liquid in the right side in the second heat exchanger 20 in the region of the engraving heads. In the first heat exchanger 10, the heat transport medium is cooled in the heat pipes 30 by the supplied coolant and absorbs thermal energy in the second heat exchanger 20 in the region of the engraving heads, as a result of which a cooling effect occurs in the heat exchanger 20 and thus in the engraving system. In the normal condition at low temperatures, the heat transport medium is liquid in the section of the heat pipes 30 located in the coolant-permeated heat exchanger 10 and, due to the delivery of thermal energy arising during engraving, evaporates in the section of the heat pipes 30 situated in the heat exchanger 20 in the region of the engraving heads. The evaporated heat transport medium flows through the heat pipes 30 in the direction of lower temperature to the heat exchanger 10 and condenses in the sections of the heat pipes 30 contained therein. In this way, a cooling circulation forms within the individual heat pipes 30.

Figure 2:
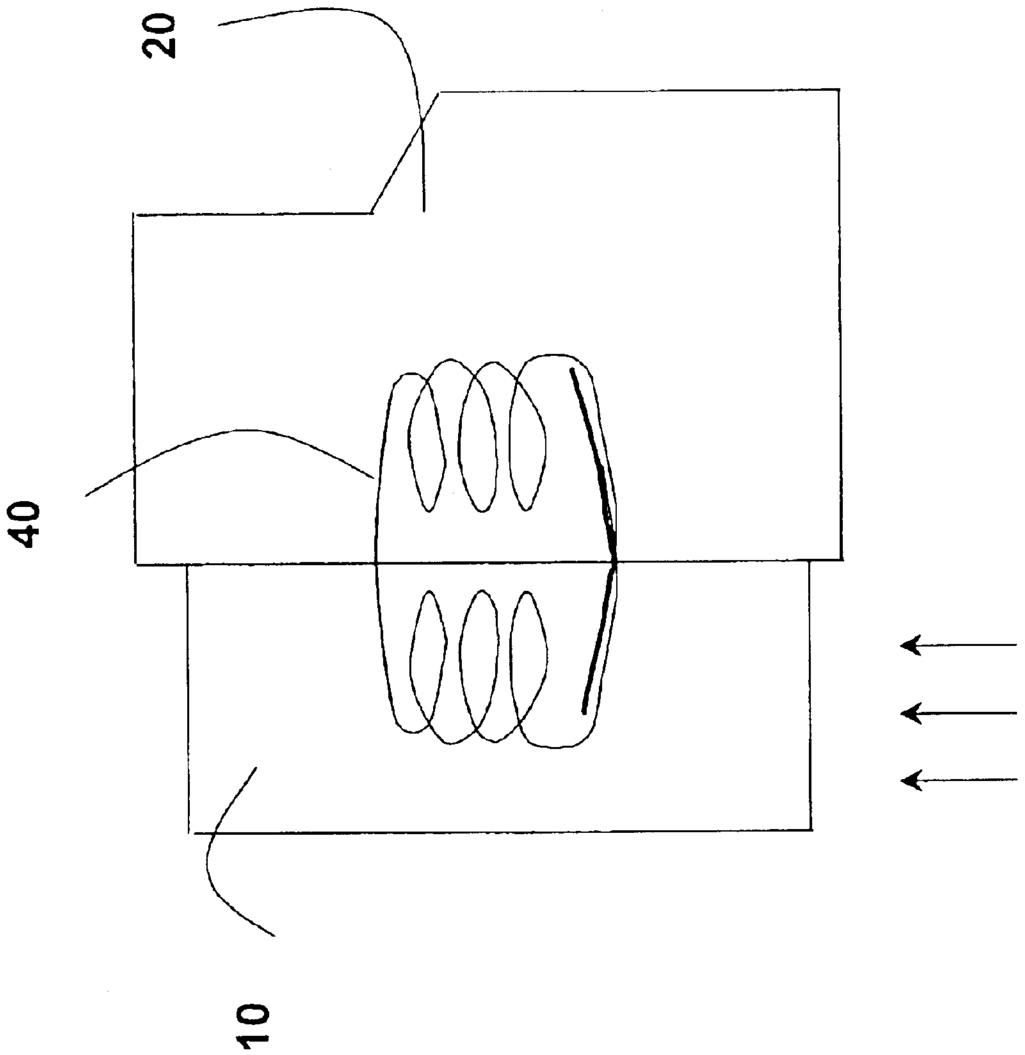
FIG. 2 is another schematic illustration of an embodiment wherein the pipes of a cooling circulation of a cooling device extend into a heat exchanger of the cooling device and into a heat exchanger of an engraving system adjacent to the cooling device.

FIG. 2 shows a further embodiment wherein the arrangement of the heat exchangers 10, 20 of the cooling device or of the engraving system is similar to that of FIG. 1. In contrast to the above, however, it is not heat pipes 30 but cooling circulations 40 in the form of coils symbolically shown in FIG. 2 that are employed, these having water flowing through them in order to achieve a cooling effect. Similar to the first embodiment, the water absorbs heat or thermal energy from the ambient air in the heat exchanger 20 in the region of the engraving head, continues to flow in the cooling circulation 40, following a direction, and emits heat or thermal energy to the ambient air in the heat exchanger 10. The heat exchanger 10 thus has air flowing through it and is thus air-cooled, as indicated by the directional arrows in FIG. 2.

Figure 3:
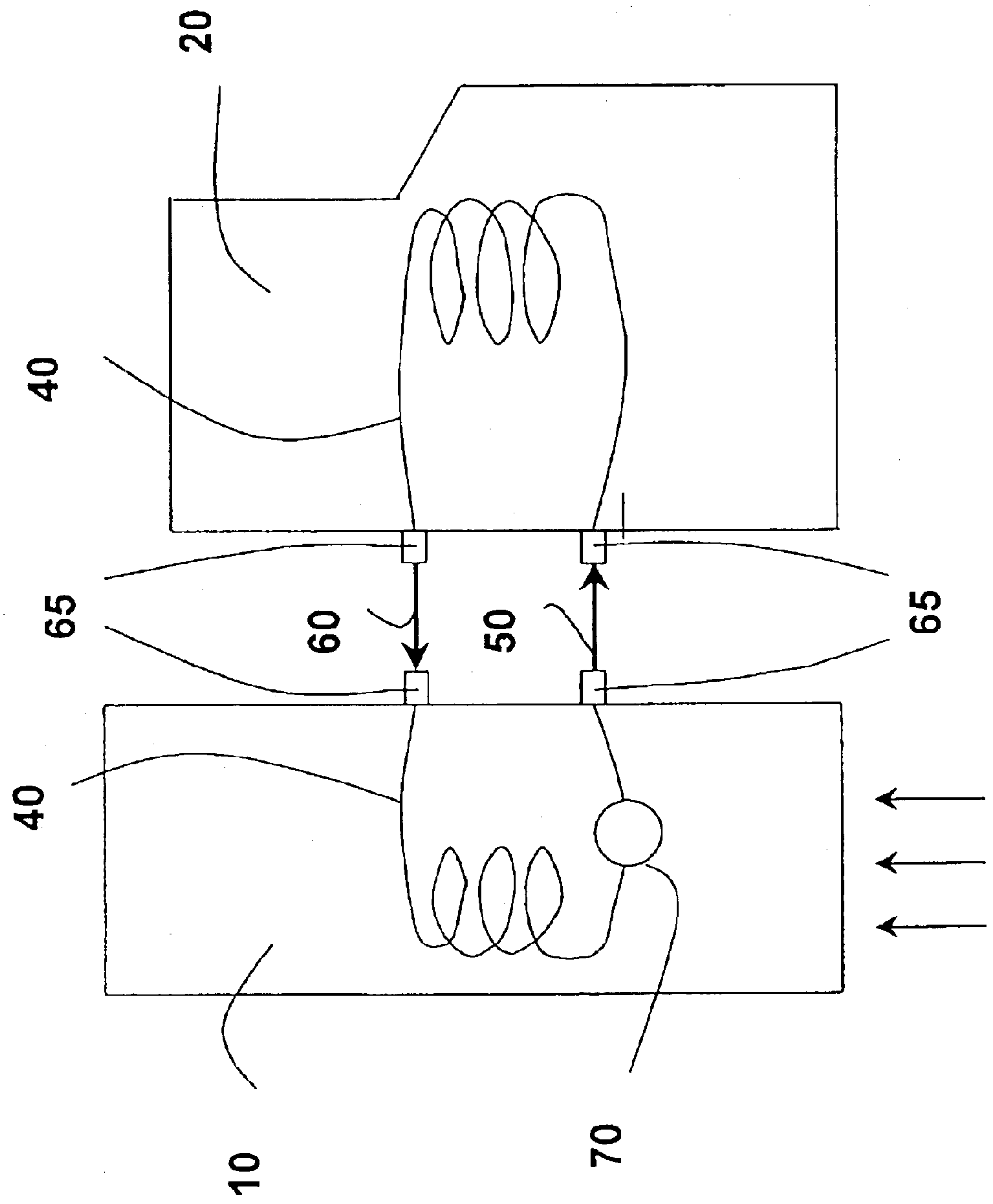
FIG. 3 a third schematic illustration of an embodiment wherein the pipes of a cooling circulation in the heat exchanger of the cooling device are connected by rapid action couplings to the pipes of the cooling circulation of the heat exchanger of an engraving system neighboring the cooling device.

FIG. 3 shows a further embodiment. Essentially the same component parts as employed under FIG. 2 can be fundamentally employed. However, the heat exchangers 10, 20 of the cooling device in FIG. 3 are not adjacent to one another or are not formed of one piece. This results in that the heat exchangers 10, 20 having walls at respectively all sides. The illustrated variation offers a locally arranged cooling device for the engraving system of an engraving device, whereby the connection of the cooling circulation 40 of the heat exchangers 10, 20 is produced by rapid action couplings 65. The rapid action couplings 65 comprise a delivery line 50 as well as a return line 60 for transporting the heat transport medium in a circulation and are preferably attached to supports that respectively carry an engraving head (not shown). With this embodiment, the heat exchangers 10, 20 can be quickly separated, for instance given maintenance work, and can be subsequently employed in a modified combination. As an expansion, a pump 70 can be arranged at the cooling circulation in order to offer further pump power to the cooling circulation in addition to the forces acting as a result of the thermal effect in the heat exchanger 40.

Of course, in addition to the three preferred embodiments, many other embodiments can be envisioned.

While preferred embodiments have been illustrated and described in detail in the drawings and foregoing description, the same are to be considered as illustrative and not restrictive in character, it being understood that only the preferred embodiment have been shown and described and that all changes and modifications that come within the spirit of the invention both now or in the future are desired to be protected.

I claim as my invention:

1. An engraving head system, comprising:

at least one engraving head carried by a moveable support;

first and second heat exchangers on the support, the second heat exchanger being positioned to cool the engraving head;

at least two conduits between the first and second heat exchangers for circulating a first coolant between the two heat exchangers; and the first heat exchanger being cooled by a second coolant.

2. The system of claim 1 wherein the first coolant comprises a coolant liquid and the second coolant comprises air.

3. A system according to claim 1 wherein the first coolant comprises liquid.

4. The system according to claim 1 wherein the first coolant is of a type which is in a gaseous state in the first heat exchanger after returning from the second heat exchanger and is condensed there and supplied as liquid coolant to the second heat exchanger where heating caused by the engraving head causes it to transform into said gaseous state.

5. The system according to claim 1 wherein a plurality of heat pipes are provided between the first heat exchanger and the second heat exchanger.

6. The system according to claim 1 wherein the first heat exchanger and the second heat exchanger directly abut one another.

7. The system according to claim 1 wherein the first and second heat exchangers each comprise a cooling circulation in the form of a coil.

8. The system according to claim 7 wherein the coils have water flowing therethrough.

9. The system according to claim 1 wherein the coolant in the second heat exchanger absorbs heat from ambient air in a region of the engraving head.

10. The system according to claim 1 wherein the first heat exchanger is air-cooled.

11. The system according to claim 1 wherein the first and second heat exchangers have cooling coils therein and the first and second heat exchangers are directly adjacent one another.

12. The system according to claim 1 wherein the first and second heat exchangers each have a cooling circulation coil therein, the first and second heat exchangers directly abut, and the two cooling coils connect to each other by two conduits.

13. The system according to claim 1 wherein the first and second heat exchangers are separated from each other on the support for the engraving head and have rapid action couplings connecting a respective single cooling coil in each of the first and second heat exchangers to one another.

14. The system according to claim 1 wherein a pump is arranged in the first heat exchanger to offer further pump power to a cooling circulation between respective single cooling coils in the first heat exchanger and the second heat exchanger.

15. The system according to claim 1 wherein a plurality of engraving heads are provided each on their own respective support and independently movable, and wherein each of the supports has first and second heat exchangers thereon.

16. An engraving head system, comprising:

at least one engraving head carried by a moveable support;

first and second heat exchangers on the support closely positioned next to one another, the second heat exchanger being positioned to cool the engraving head with a liquid coolant;

at least two conduits between the first and second heat exchangers for circulating the liquid coolant between the two heat exchangers; and the first heat exchanger being cooled by air circulation.

* * * * *